(12) United States Patent
Jutte (10) Patent No.: US 6,828,537 B2
(45) Date of Patent: Dec. 7, 2004

(54) OPTICAL SCANNING DEVICE

(75) Inventor: Petrus Theodorus Jutte, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 55 days.

(21) Appl. No.: 10/135,350

(22) Filed: Apr. 30, 2002

(65) Prior Publication Data

US 2002/0185585 A1 Dec. 12, 2002

(30) Foreign Application Priority Data

May 3, 2001 (EP) .............................................. 01201605

(51) Int. Cl.$^7$ ............................................... G02B 27/40

(52) U.S. Cl. ................. 250/201.2; 250/201.5; 369/44.41; 369/53.23

(58) Field of Search ........................... 250/201.2, 201.4, 250/201.5, 234; 369/44.26, 44.37, 44.41, 44.42, 53.22, 53.23, 112.03, 120

(56) References Cited

U.S. PATENT DOCUMENTS

| | | | |
|---|---|---|---|
| 5,648,950 A | 7/1997 | Takeda et al. | 369/110 |
| 5,687,153 A | 11/1997 | Komma et al. | 369/110 |
| 5,757,741 A | 5/1998 | Jiang et al. | 369/44.12 |
| 6,567,355 B2 * | 5/2003 | Izumi et al. | 369/44.41 |
| 6,596,984 B2 * | 7/2003 | Vrehen | 250/234 |

FOREIGN PATENT DOCUMENTS

| | | | | |
|---|---|---|---|---|
| EP | 0747893 A2 | 12/1996 | | G11B/7/12 |
| EP | 0829863 A2 | 3/1998 | | G11B/7/135 |
| EP | 1107242 A2 | 6/2001 | | G11B/7/135 |
| EP | 1109163 A2 | 6/2001 | | G11B/7/12 |

* cited by examiner

Primary Examiner—Kevin Pyo
(74) Attorney, Agent, or Firm—Michael E. Belk (57) ABSTRACT

A radiation detector array for radial tracking error detection and focus error detection, including a first plurality of spot detectors (100, 102, 104) for conducting multiple-spot radial tracking error detection, said first plurality of spot detectors including a first spot detector (100) arranged substantially centrally thereof. The array further includes a second spot detector (106) for conducting spot-size focus error detection in combination with said first spot detector.

17 Claims, 5 Drawing Sheets

OPTICAL SCANNING DEVICE

This invention relates to an optical scanning device comprising a radiation detector array for performing both focus error detection and radial tracking error detection, to such a radiation detector array and to a method for adjusting such an optical scanning device.

One optical recording and playback system under development is the DVR (Digital Video Recording) system. The system uses a relatively high numerical aperture (NA) objective lens, of 0.85, compared to the conventional Compact Disk (CD) NA of 0.45 and the conventional Digital Versatile Disk (DVD) NA of 0.60, a "blue" wavelength of approximately 400 to 430 nm, and recording on groove tracks alone or on both land and groove data tracks.

Various different methods are known for focus error detection and radial tracking error detection. The focus error detection methods include knife edge pupil obscuration, in which the beam is split into two by e.g. a prism and the position of the spots on two spot detectors indicate correct focusing; astigmatic focusing, in which an astigmatic spot on the detector is created by means of a cylindrical lens or a plane parallel plate, and variations in the shape of the spot from circular are detected by a diamond-shaped quadrant spot detector; and spot size detection, in which the beam is separated into two by e.g. a microprism and detecting the resulting spot sizes before and after refocusing respectively.

The radial tracking error detection methods include push-pull radial tracking, in which a difference in signal between two pupil halves are measured on separate detectors; three spot (or three beam) central aperture radial tracking, in which the radiation beam is split into three by a diffraction grating, and the outer (satellite) spots are set a quarter track pitch off the main spot and the difference of their signals used to generate the tracking error signal; three spots push-pull radial tracking, in which the radiation beam is split into three by a diffraction grating and a difference between the push-pull signals of the main spot and the satellite spots is used as the tracking error signal; and Differential Phase or Time Detection (DPD or DTD) radial tracking, in which the contribution of the radial offset of the phase of the ($\pm 1, \pm 1$) orders is exploited in a square-shaped quadrant spot detector. The three spot push-pull radial tracking system has the advantage over one spot push-pull systems is that systematic errors, including symmetric errors and asymmetric errors, may be compensated for automatically. However, the system requires additional detector elements and connections, increasing the complexity of the detector array. A DPD radial tracking method is used in certain systems, such as DVD+RW and DVD−RW scanning devices. DVD-ROM and DVD-video also use DPD or DTD radial tracking.

In the case of a DVR system using push-pull tracking, a relatively large modulation of the DVR optical signal reduces the effectiveness of the conventional astigmatic focus error detection method, because of its sensitivity to radial-to-focus crosstalk.

EP-A-0523319 describes an optical pickup unit including a detector array arranged such that a push-pull method is used for detecting a tracking error, and the focal point is detected by measuring a beam size. Only a single spot detector is used, even in a three beam method which is suggested as a possible alternative method of detecting a tracking error.

A known arrangement of optical pick-up unit, produced by Sony and known as the "Laser Coupler", has a detector array which combines one spot push-pull radial tracking with spot size detection focusing.

Other examples of the use of spot size detection focusing and one beam push-pull tracking are described in U.S. Pat. Nos. 5,278,401, 5,347,504, JP-A-5-266530, JP-A-4-229435, JP-A-5-274684 and JP-A-5-62221.

In accordance with one aspect of the present invention there is provided a radiation detector array comprising a plurality of spot detectors for detecting radiation beams scanning an optical record carrier in the form of a disk having a tangential direction in which tracks are arranged and a radial direction orthogonal thereto, each said spot detector being arranged to detect a characteristic of a spot formed by a said beam and each said spot detector comprising a plurality of detector elements for detecting different parts of a said spot, wherein said detector array is for radial tracking error detection and focus error detection, said array comprising:

a first plurality of spot detectors for conducting multiple-spot radial tracking error detection, said first plurality of spot detectors including a first spot detector arranged substantially centrally thereof; and a second spot detector for conducting spot-size focus error detection in combination with said first spot detector.

This aspect of the invention makes it possible to combine a multiple-spot radial tracking error method with spot-size focus error detection efficiently, using a relatively small number of detector elements and connections.

Preferably, said second spot detector is arranged in a position offset to one side of said first line. More preferably, said second spot detector is arranged in a second line with said first spot detector, which second line is arranged at an angle of at least 15° with respect to said first line. By such an arrangement, outer spots, produced by a diffractive element for the multi-spot tracking error detection, are inhibited from interfering with the focus error signal detected by the first and second spot detectors. In particular, higher order spots, which extend in the direction of the first line, are inhibited from interfering with the desired signal detection.

Preferably, the first spot detector comprises a plurality of detector elements separated by separation means, said separation means comprising a first separation means defining a signal separation for use in said radial tracking error detection and a second separation means defining a signal separation for use in said focus error detection, wherein said first and second separation means are arranged substantially parallel. This arrangement tends to reduce the number of detector elements required to conduct both radial tracking and focus error detection.

In this parallel arrangement, the second spot detector is preferably arranged in a second line with said first spot detector, which second line is arranged at an angle of less than 75° with respect to said first line. This allows the adjustment of an optical scanning device during manufacture to correctly centre the spot on both the first and second spot detectors for spot size detection, by azimuthal rotation of the optical component producing the spot separation.

In an alternative arrangement, the first spot detector comprises a plurality of detector elements separated by separation means, said separation means comprising a first separation means defining a signal separation for use in said radial tracking error detection and a second separation means defining a signal separation for use in said focus error detection, wherein said first and second separation means are arranged substantially orthogonally. Whilst not as efficient in terms of the number of detector elements included, this alternative arrangement also provides an otherwise efficient arrangement.

A radiation detector array according to any preceding claim, wherein said second spot detector comprises less detector elements than said first spot detector.

The second spot detector is preferably arranged not to participate in said radial tracking error detection. This reduces the number of detector elements and connections required in the detector array.

Alternatively, fifth and sixth spot detectors may be arranged generally linearly along a further line substantially parallel to a radial equivalent direction and having said second spot detector arranged substantially centrally thereof. This can be used to improve the efficacy of radial tracking.

A radiation detector array according to any preceding claim, wherein said first and second spots are adapted to jointly detect a data signal containing data recorded on the optical record carrier.

In accordance with a second aspect of the invention, there is provided an optical scanning device comprising a radiation detector array as described, the device comprising a diffractive component for generating multiple beams arranged in a line of diffraction, and a beam separating component for separating at least one of said multiple beams into two further beams in a direction having at least a component of orthogonality with respect to said line of diffraction. The device provides the appropriate beam configuration for the detector array of the first aspect.

In accordance with a further aspect of the invention, there is provided a method comprising adjusting said beam separating component in position with respect to said detector array by azimuthal rotation about an axis of said at least one of said multiple beams. This allows the centring of the spots with respect to the spot size detection arrangement.

Further aspects and advantages of the invention will become apparent from the following description of preferred embodiments of the invention, made with reference to the accompanying drawings, wherein.

In accordance with embodiments of the invention, a recordable optical disk 18, such as a DVR and/or a DVD-RW is used for storing data, which may be written and read-out by means of the optical scanning device. The disk includes an outer transparent layer covering at least one information layer. In the case of a multilayer optical disk, two or more information layers are arranged behind the cover layer, at different depths within the disk. The side of the information layer, or in the case of a multilayer disk the side of the layer furthest away from the cover layer, facing away from the transparent layer is protected from environmental influences by a protection layer. The side of the transparent layer facing the device is the disk entrance face.

Information may be stored in the information layer or layers of the optical disk in the form of optically detectable marks arranged in substantially parallel, concentric or spiral tracks. The marks may be in any optically readable form, for example in the form of pits or areas with a reflection coefficient different from their surroundings. The information layer or layers are formed of an optically recordable material.

Figure 1:
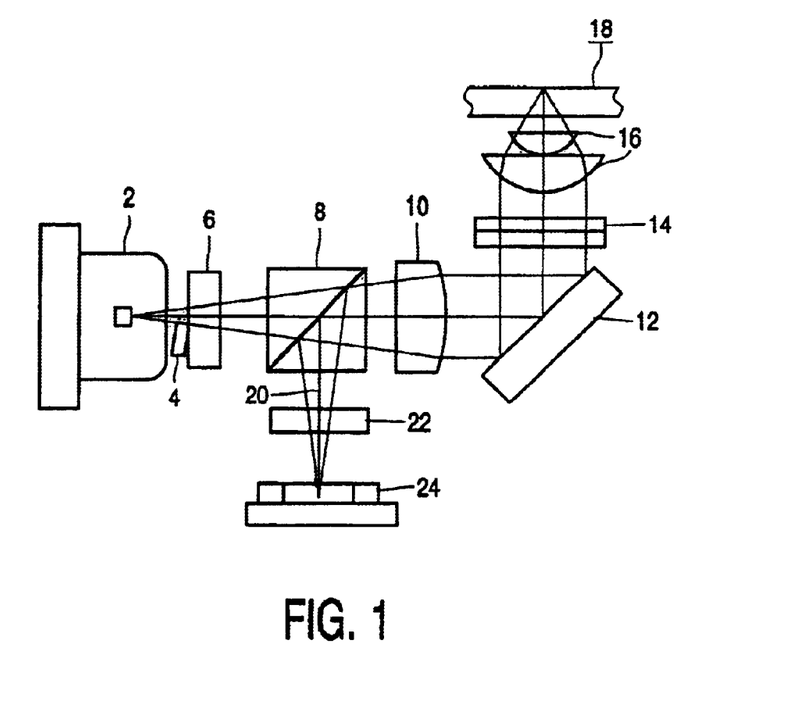
FIG. 1 is a schematic plan view of an optical scanning device arranged in accordance with embodiments of the invention.

The optical scanning device includes a polarised radiation source 2, for example a semiconductor laser, operating at a predetermined wavelength, for example $\lambda$=405 nm, and with a linear polarisation. The source 2 emits a diverging radiation beam 4. The light path includes a diffractive grating element 6 for forming three separate beams, a main beam and two satellite beams, prior to the beams passing through a polarising beam splitter 8. Behind the beam splitter 8 lies a collimating lens 10 through which the beams pass before being reflected by folding mirror 12 towards the disk 18. Before reaching the disk, the beams pass through a quarter wavelength plate 14 which converts the linear polarisation of the beams into a circular polarisation, and a high-power, compound objective lens 16 for focusing the beams onto spots on an information layer in the disk 18. On reflection from the disk, the handedness of the circular polarisation is reversed, and on passing through the quarter wavelength plate 14 the polarisation of the beams is altered into a linear polarisation which is orthogonal to the original linear polarisation of the beams. After folding, the beams are reflected, at least in most part, by beam splitter 8 and, via a beam separating component 22, onto the photodetector array 24, which converts the optical signals into electric signals for data read-out, and signals for focus control and tracking error control, as will be described in further detail below.

Figure 2A:
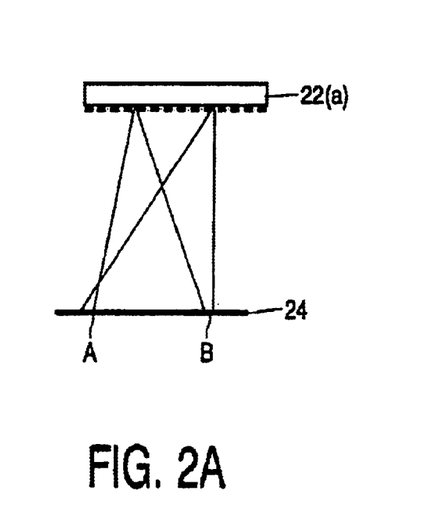
FIGS. 2(A) and 2(B) are schematic plan views of alternative arrangements of beam separating arrangements for spot size detection.
Figure 2B:
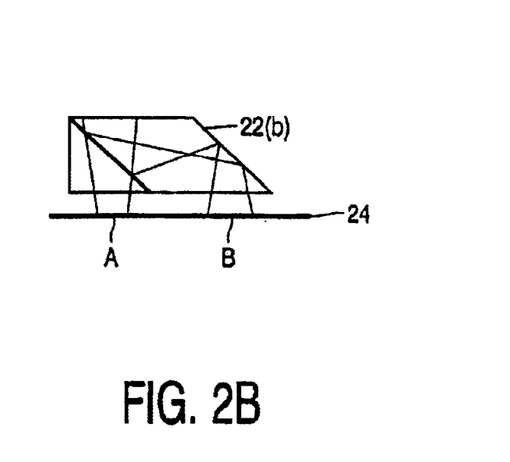
Figure 3A:
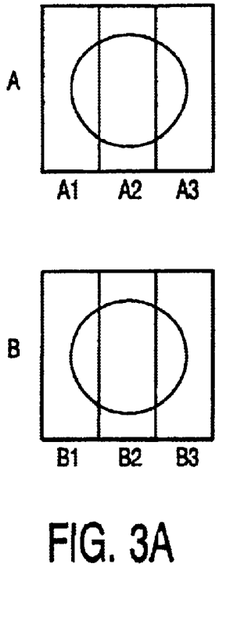
FIGS. 3(A), 3(B) and 3(C) are schematic plan views of spots detected on conventional spot size detector arrangements, in different focal conditions.
Figure 3B:
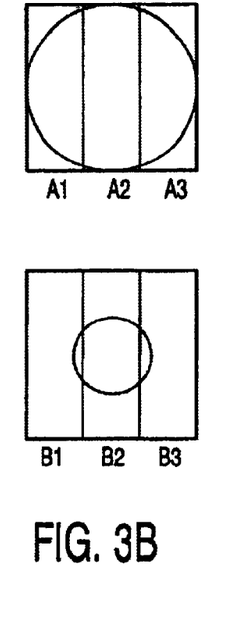
Figure 3C:
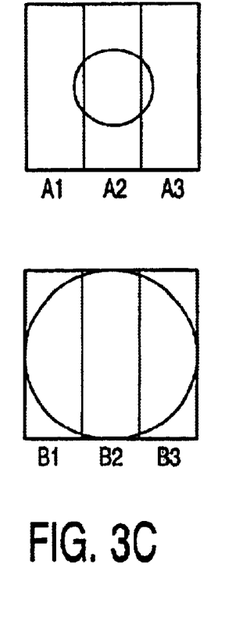

FIG. 2(a) shows a first alternative, itself known in the art, used in embodiments of the present invention for providing beam separation for use in spot size detection, in the form of a holographic plate 22(a) including a hologram forming two separate beams forming two spots, A and B, on the detector array 24. An alternative is shown in FIG. 2(B), namely a microprism 22(b) providing a similar effect. Spot A is post-focal, whereas spot B is pre-focal (or vice-versa). When the beam is correctly focused, the two spots have identical size, as shown in FIG. 3(A). If the objective lens 16 is too close to the disk 18, spot A is relatively large, as shown in FIG. 3(B). If the objective lens 16 is too far from the disk 18, spot B is relatively large, as shown in FIG. 3(C). FIGS. 3(A) to (C) show a conventional spot size detector arrangement, with each of spots A and B being detected by different spot detectors in the detector array, formed of detector elements A1, A2, A3 and B1, B2, B3 respectively. Connections are formed in the conventional detector array to provide the focus error signal (FE) as follows:

$$FE=(A1+A3+B2)-(A2+B1+B3)$$

Figure 4A:
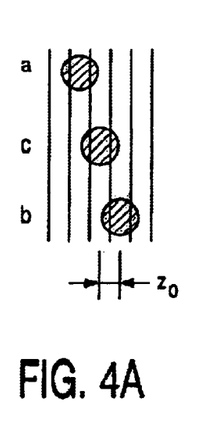
FIGS. 4(A) and 4(B) are schematic plan views of three spots focused on conventional data tracks of an optical disk and conventional three spots push-pull tracking error detectors, respectively.
Figure 4B:
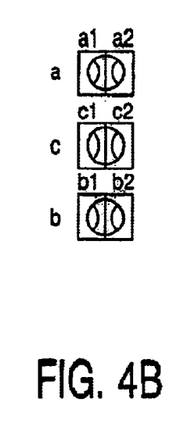

FIG. 4(A) shows an arrangement, used in the present invention, of three beams, a, b and c, formed by diffractive plate 6, correctly tracking tracks of the optical disk 18. FIG. 4(B) shows a conventional arrangement of three spot detectors, each including two detector elements, a1, a2; b1, b2; and c1, c2, respectively, used for detecting a push-pull radial tracking error in the three beam spots a, b and c. The spot detectors a, b, c are arranged in the optical scanning device in a generally tangential equivalent (track-parallel) direction. Three spots push pull radial tracking uses the push pull signal of all three spots. The push pull signal of the main spot c and the two satellites a and b are described as a function of the detracking x as:

$$PP(c) = \gamma m_{pp} \cdot \sin(2\pi x/q)$$

$$PP(a) = m_{pp} \cdot \sin(2\pi(x-xo)/q)$$

$$PP(b) = m_{pp} \cdot \sin(2\pi(x+xo)/q)$$

In the above, $m_{pp}$ is the push pull modulation, q is the track pitch, xo is the offset of each of the spots a and b, generally set at q/2 to maximise the signal, and γ being the diffraction efficiency, or more particularly in the case of a grating, the grating ratio.

Connections are formed in the conventional detector array to provide the radial error signal (RE) as follows:

$$RE = PP(c) - \gamma(PP(a) + PP(b))$$

Figure 5:
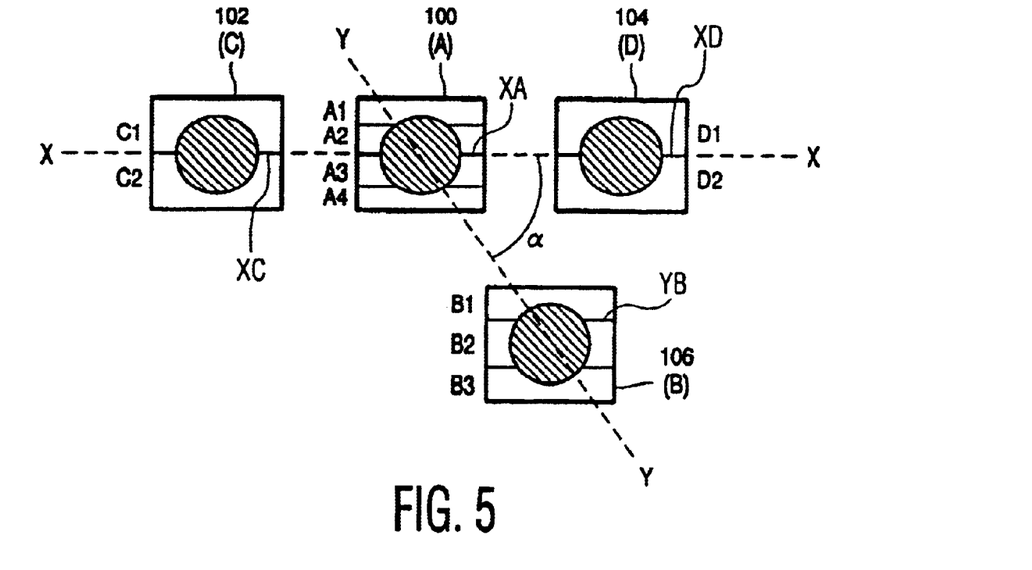
FIG. 5 is a schematic plan view of a detector array arranged in accordance with a first embodiment of the invention.

FIG. 5 shows a radiation detector array in accordance with a first embodiment of the invention. The detectors are in the form of photodiode elements forming separate spot detectors, each spot detector being separated into detector elements separated by separation lines XC, XA, XD, YB providing desired signal separations.

The arrangement in this embodiment includes four spot detectors of equal size. Three spot detectors 100, 102, 104 are arranged generally along line X—X, which is in a substantially track-tangential equivalent direction in the detector array. The satellite spots may for example each be separated by half a track pitch. A central spot detector 100 includes four rectangular detector elements A1 to A4, arranged side by side and separated by three separation lines arranged in a substantially track-tangential equivalent direction, to detect the location of a main spot A. Satellite spot detectors 102 and 104 each comprise two detector elements, C1, C2, and D1, D2 respectively, forming equal halves of the spot detector, separated by a separation lines XC, XD, arranged in the track-tangential equivalent direction. Detectors 102, 104 detect satellite spots. C, D of main spot A. Spot detectors 100, 102, 104 are arranged to conduct three spot push pull radial tracking error detection.

A further spot detector 106 is provided to detect the size of second main spot B formed by beam separator 22. Detector 106 is arranged offset to one side of line X—X, along line Y—Y extending through the centre to spot detector 100, forming an angle α with respect to line X—X. Angle α is in this embodiment preferably at least 15°, in order to avoid interference between the satellite spots of spot B and/or higher order spots of either of the main spots A, B, and the desired spot signal detection on the spot detectors. Furthermore, the higher α is, the smaller the spatial separation required between spots A and B, which is advantageous in terms of a reduction of the complexity of the holographic plate or the size of the micro-prism used as the beam separator. Angle α is furthermore in this embodiment preferably less than 75°, such that the position of spot c in the radial equivalent direction may be adjusted effectively by azimuthal rotation of beam separating component 22 within the optical scanning device during manufacture. Thereby, a useful degree of manufacturing tolerance can be corrected for, both in the separation of spots A and B when in the correctly focused configuration, and in the azimuthal arrangement of the spots, whilst ensuring that spots A and B may remain precisely centred on detector elements 100 and 106 respectively. Such a degree of tolerance is provided because the position of the properly-focused spots in the tangential equivalent direction is not as critical as the position of the spots in the radial equivalent direction on the spot detectors, due to the arrangement of the separation lines in the tangential equivalent direction. Thus, 15°<α<75°. In one embodiment, the avoidance of interference is a preferable desiderata and 45°<α<75°. In an alternative embodiment, ease of adjustability during manufacture is a preferable desiderata, and 15°<α<45°.

Spot detector 106 is arranged as a detector for spot size only, having a central detector element B2 and out detector elements B1 and B3. The detector elements are separated by two separations lines YB are formed in detector 106 running parallel to the tangential equivalent direction.

Detector elements A1 and A4 of spot detector 100 correspond in size and shape to elements B1 and B3 of spot detector 106. Detector elements A2 and A3 in combination correspond in size and shape to element B2 of spot detector 106, and are separated by a central separation line.

Connections are formed in the detector array of this embodiment to provide a focus error signal (FE), a radial error signal (RE), and a data read-out signal (RF) as follows:

$$FE = (A1+A4+B2)-(A2+A3+B1+B3)$$

$$RE = (A1+A2-A3-A4)+\gamma(C1-C2+D1-D2)$$

$$RF = (A1+A2+A3+A4+B1+B2+B3)$$

In this embodiment, the separation lines for separating the signals used in both the spot size focus error detection and the push pull tracking error detection are parallel, which has the effect of reducing the total number of signal connections required in the detector array. The satellite spots of main spot B are also not detected in order to reduce the number of signal connections used.

Figure 6:
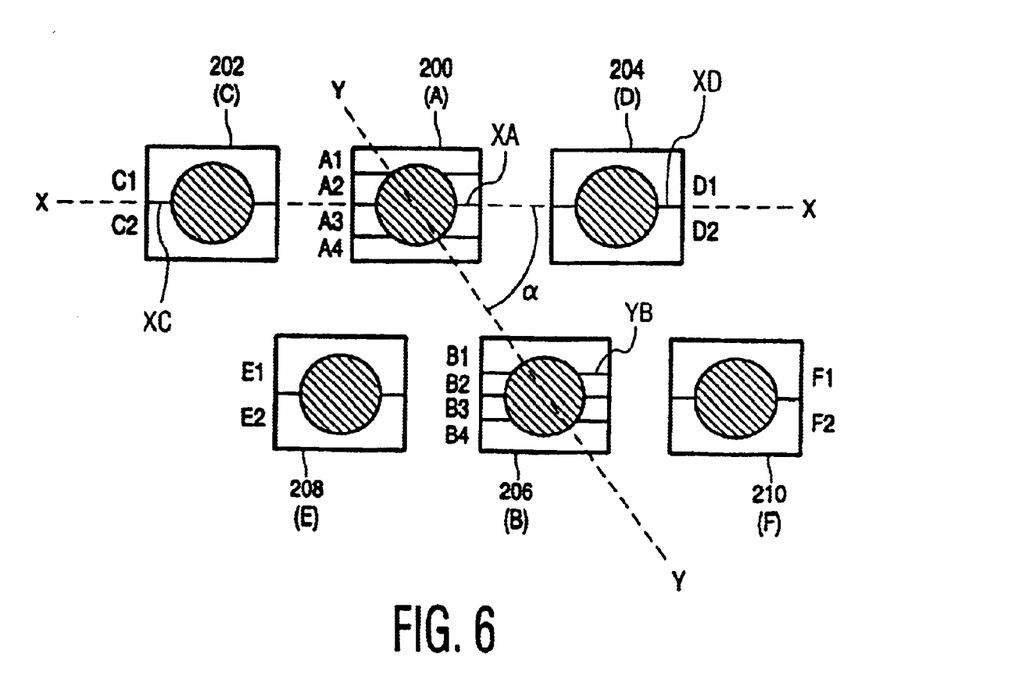
FIG. 6 is a schematic plan view of a detector array arranged in accordance with a second embodiment of the invention.

FIG. 6 illustrates a second embodiment of the invention, which is similar in functionality to the arrangement of the first embodiment, except that the satellite spots (E and F) of spot B are detected and used for enhancing the push pull tracking error signal. Spot detectors 200, 202, 204 correspond with detectors 100, 102, 104 as previously described. Spot detector 106 previously described is replaced with a set of three spot detectors 206, 208, 210, which correspond in shape and configuration with detectors 100, 102, 104 as previously described, and are arranged generally parallel to line X—X although offset to one side thereof. Detector 206 is arranged along line Y—Y, which passes through the centre of detector 200, forming an angle α with line X—X. For the reasons described above, the arrangement is preferably such that 15°<α<75°. In one embodiment, the avoidance of interference is a preferable desiderata and 45°<α<75°. In an alternative embodiment, ease of spot-centring adjustability during manufacture is a preferable desiderata, and 15°<α<45°.

Connections are formed in the detector array of this embodiment to provide a focus error signal (FE), a radial error signal (RE), and a data read-out signal (RF) as follows:

$$FE = (A1+A4+B2+B3)-(A2+A3+B1+B4)$$

$$RE = (A1+A2-A3-A4-B1-B2+B3+B4)+ \\ \gamma(C1-C2+D1-D2-E1+E2-F1-F2)$$

$$RF = (A1+A2+A3+A4+B1+B2+B3+B4)$$

Figure 7:
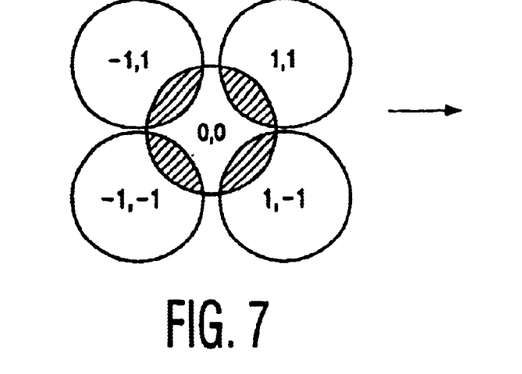
FIG. 7 is a schematic plan view of spots used in DPD radial tracking.
Figure 8:
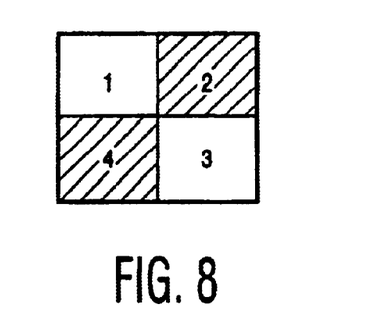
FIG. 8 is a schematic plan view of a spot detector used in DPD radial tracking.

FIG. 7 is a schematic illustration of the four (±1,±1) orders of a main beam spot in an optical scanning system. FIG. 8 shows a conventional spot detector array for performing DPD radial tracking, including four quadrants 1 to 4 of a square spot detector. The phase or time difference of the signals (1+3) and (2+4) is a measure for the tracking offset.

Figure 9:
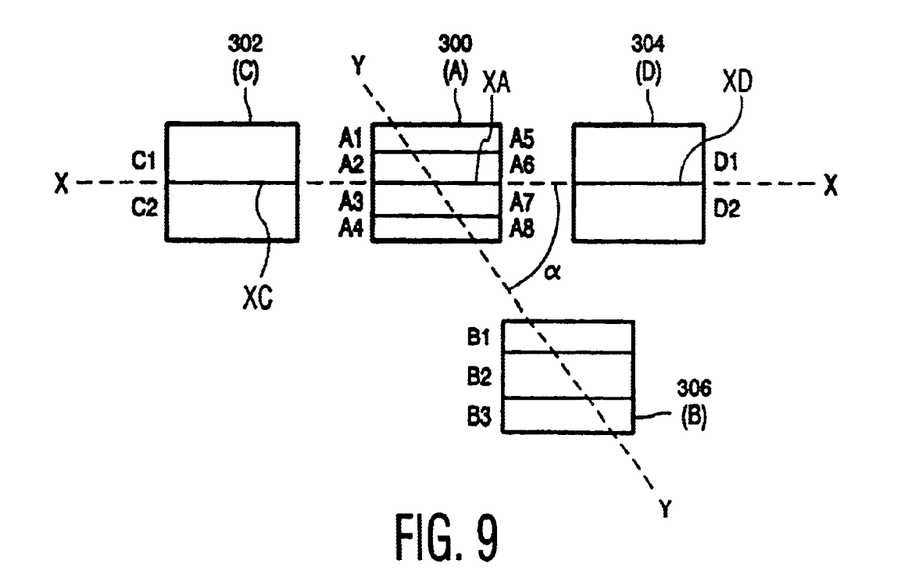
FIG. 9 is a schematic plan view of a detector array arranged in accordance with a third embodiment of the invention.

FIG. 9 illustrates a third embodiment of the invention in which spot size focus error detection, three spots push pull radial tracking error detection and DPD radial tracking error detection are all enabled. The arrangement is similar to that of the first embodiment, with spot detectors 300, 302, 304 and 306 corresponding with spot detectors 100, 102, 104 and 106 as previously described, except that the first spot detector 300 is adapted for performing DPD radial tracking. For this purpose, spot detector 300 comprises a further separation line, centrally arranged orthogonal to the remaining separation lines, to divide each of the described detector elements A1 to A4 in half, thereby forming a further four (a total of eight) half-size rectangular detector elements A5 to A8.

For the reasons described above, the arrangement is preferably such that $15° < \alpha < 75°$. In one embodiment, the avoidance of interference is a preferable desiderata and $45° < \alpha < 75°$. In an alternative embodiment, ease of spot-centring adjustability during manufacture is a preferable desiderata, and $15° < \alpha < 45°$.

Connections are formed in the detector array of this embodiment to provide a focus error signal (FE), a push pull radial error signal (RE1), a DPD radial error signal (RE2) and a data read-out signal (RF) as follows:

$$FE = (A1+A4+A5+A8+B2) - (A2+A3+A6+A7+B1+B3)$$

$$RE1 = (A1+A2+A5+A6-A3-A4-A7-A8) + \gamma(C1-C2+D1-D2)$$

$$RE2 = (A1+A2+A7+A8) - (A3+A4+A5+A6)$$

$$RF = (A1+A2+A3+A4+A5+A6+A7+A8+B1+B2+B3)$$

Figure 10:
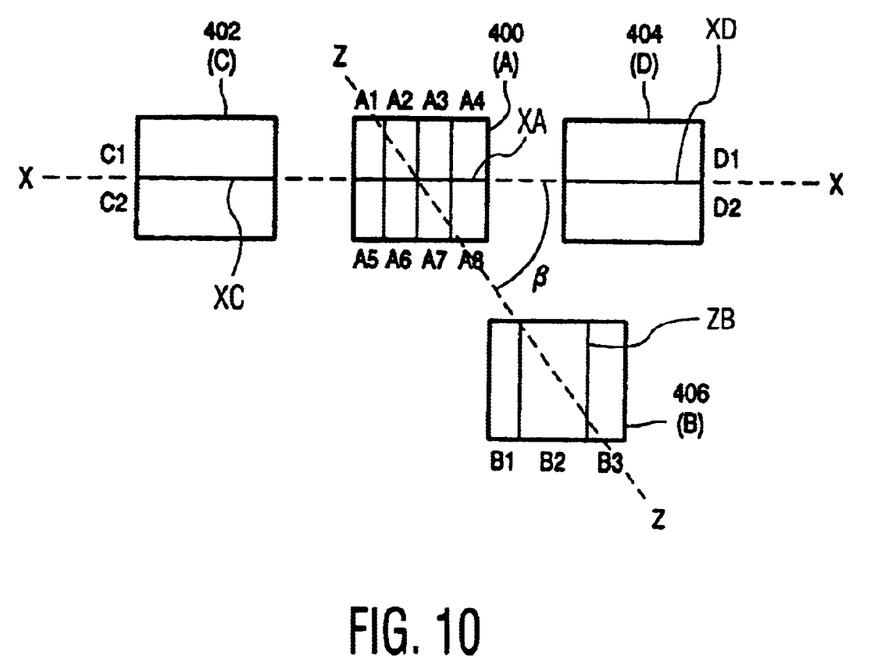
FIG. 10 is a schematic plan view of a detector array arranged in accordance with a fourth embodiment of the invention.

FIG. 10 illustrates a fourth embodiment of the invention in which spot size focus error detection, three spots push pull radial tracking error detection and DPD radial tracking error detection are all enabled. The arrangement is similar to that of the third embodiment, with spot detectors 400, 402, 404 and 406 corresponding with spot detectors 300, 302, 304 and 306 as previously described, except that the separation lines for providing the spot size detection signal separation are arranged orthogonal to the separation lines for providing the push pull tracking error signal detection, i.e. in the radial equivalent direction, instead of parallel thereto. In this embodiment, detector 406 is arranged along line Z—Z which passes through the centre of detector 400. All of the advantages ascribed to the arrangement of line Y—Y in the first to third embodiments with $15° < \alpha < 75°$ are here obtained with $15° < \beta \leq 90°$. In a preferred embodiment, $45° < \beta < 90$, in order to increase the effect of the advantages obtained.

Connections are formed in the detector array of this embodiment to provide a focus error signal (FE), a push pull radial error signal (RE1), a DPD radial error signal (RE2) and a data read-out signal (RF) as follows:

$$FE = (A1+A4+A5+A8+B2) - (A2+A3+A6+A7+B1+B3)$$

$$RE = 1(A1+A2+A3+A4-A5-A6-A7-A8) + \gamma(C1-C2+D1-D2)$$

$$RE2 = (A1+A2+A7+A8) - (A3+A4+A5+A6)$$

$$RF = (A1+A2+A3+A4+A5+A6+A7+A8+B1+B2+B3)$$

The above embodiments are to be understood as illustrative examples of the invention. Further embodiments of the invention are envisaged. For example, the orthogonal separation lines used for the focus error signal and push pull radial error signal generation in the fourth embodiment may also be used in an embodiment otherwise similar to the first or second. Furthermore, the additional push pull signal detectors used in the second embodiment may be used in the third or fourth embodiment. It is to be understood that any feature described in relation to one embodiment may also be used in other of the embodiments. Furthermore, equivalents and modifications not described above may also be employed without departing from the scope of the invention, which is defined in the accompanying claims.

What is claimed is:

1. A radiation detector array comprising a plurality of spot detectors for detecting radiation beams scanning an optical record carrier, each said spot detector being arranged to detect a characteristic of a spot formed by said beam and each said spot detector comprising a plurality of detector elements for detecting different parts of a said spot, wherein said detector array is for radial tracking error detection and focus error detection, said array comprising:

a first plurality of spot detectors for conducting multiple-spot radial tracking error detection, said first plurality of spot detectors including a first spot detector arranged substantially centrally thereof, wherein said first plurality of spot detectors are arranged generally linearly along a first line; and a second spot detector for conducting spot-size focus error detection in combination with said first spot detector, wherein said second spot detector is arranged in a second line with said first spot detector, which second line is arranged at an angle of less than 75° with respect to said first line.

2. A radiation detector array according to claim 1, wherein said second spot detector is arranged in a position offset to one side of said first line.

3. A radiation detector according to claim 2, wherein said second spot detector is arranged in a second line with said first spot detector, which second line is arranged at an angle of at least 15° with respect to said first line.

4. A radiation detector array according to claim 1, wherein said first plurality of spot detectors are arranged to conduct three spot push-pull tracking error detection.

5. A radiation detector array according to claim 1, wherein said first plurality comprises third and fourth spot detectors which are arranged not to participate in said focus error detection.

6. A radiation detector array according to claim 1, wherein said first spot detector comprises a plurality of detector elements separated by said a first separation means (XC, XA, XD)) defining a signal separation for use in said radial tracking error detection and said second spot detector comprises a plurality of detector elements separated by a second separation means (YB) defining a signal separation for use in said focus error detection, wherein said first and second separation means are arranged substantially parallel.

7. A radiation detector according to claim 6, wherein said first separation means is arranged substantially centrally of said first detector, and said second separation means is arranged outwardly from a center of said second detector.

8. A radiation detector array according to claim 1, wherein said first spot detector comprises a plurality of detector elements separated by separation means, said separation means comprising a first separation means defining a signal separation for use in said radial tracking error detection and a second separation means defining a signal separation for use in said focus error detection, wherein said first and second separation means are arranged substantially orthogonally.

9. A radiation detector array according to claim 1, wherein said second spot detector comprises less detector elements than said first spot detector.

10. A radiation detector array according to claim 1, wherein said first spot detector, and/or said second spot detector is/are further arranged to conduct differential phase detection radial tracking error detection.

11. A radiation detector array according to claim 1, wherein said second spot detector is arranged not to participate in said radial tracking error detection.

12. A radiation detector array according to claim 1, wherein said detector array comprises fifth and sixth spot detectors having said second spot detector arranged substantially centrally thereof.

13. A radiation detector according to claim 12, wherein said fifth and sixth spot detectors and said second spot detector are arranged generally linearly along a further line substantially parallel to said first line.

14. A radiation detector array according to claim 1, wherein said first and second spots are adapted to jointly detect a data signal containing data recorded on the optical record carrier.

15. An optical scanning device comprising a radiation detector array according to claim 1.

16. An optical scanning device according to claim 15, said device comprising a diffractive component for generating multiple beams arranged in a line of diffraction, and a beam separating component for separating at least one of said multiple beams into two further beams in a direction having at least a component of orthogonality with respect to said line of diffraction.

17. A method of adjusting an optical scanning device according to claim 16, said method comprising adjusting said beam separating component in position with respect to said detector array by azimuthal rotation about an axis of said at least one of said multiple beams.

* * * * *